United States Patent
Suzuki (10) Patent No.: US 6,318,171 B1
(45) Date of Patent: Nov. 20, 2001

(54) FLOW RATE SENSOR IMPLEMENTING A PLURALITY OF INNER TUBES LOCATED WITHIN A SENSOR TUBE

(75) Inventor: Isao Suzuki, Tokyo (JP)

(73) Assignee: MKS Japan, Inc., Tokyo (JP)

( * ) Notice: Subject to any disclaimer, the term of this patent is extended or adjusted under 35 U.S.C. 154(b) by 0 days.

(21) Appl. No.: 09/451,927

(22) Filed: Dec. 1, 1999

(30) Foreign Application Priority Data

Dec. 1, 1998 (JP) .................................................. 10-341800
Jun. 18, 1999 (JP) .................................................. 11-172854

(51) Int. Cl.$^7$ .................................................. G01F 1/68
(52) U.S. Cl. .................................................. 73/204.27
(58) Field of Search .................... 73/204.22, 204.27, 73/204.15

(56) References Cited

U.S. PATENT DOCUMENTS

| | | | |
|---|---|---|---|
| 5,285,673 | * | 2/1994 | Drexel et al. ...................... 73/204.27 |
| 5,410,912 | * | 5/1995 | Suzuki ............................... 73/204.22 |
| 5,741,968 | * | 4/1998 | Arai .................................. 73/204.22 |
| 5,792,952 | * | 8/1998 | Ritchart ............................ 73/204.27 |
| 6,125,695 | * | 10/2000 | Alvesteffer et al. ............... 73/204.27 |

* cited by examiner

*Primary Examiner*—Harshad Patel
(74) *Attorney, Agent, or Firm*—Wenderoth, Lind, and Ponack, L.L.P.

(57) ABSTRACT

There is provided a flow rate sensor comprising: a pair of heating resistors operable to heat a sensor tube; a temperature sensor operable to control respective temperatures of the heating resistors; and a case operable to hold the heating resistors and the temperature sensor. The flow rate sensor is adapted to detect a flow rate of a fluid flowing in the sensor tube based on variations of voltages applied to the heating resistors, wherein the variations occur according to the flow rate of the fluid. The flow rate sensor further comprises a voltage applying device operable to arbitrarily set an increase in temperature of each of the heating resistors. The sensor tube has opposite ends thereof thermally connected to the case. The temperature sensor is positioned to be equidistant from the opposite ends of the sensor.

8 Claims, 11 Drawing Sheets

FLOW RATE SENSOR IMPLEMENTING A PLURALITY OF INNER TUBES LOCATED WITHIN A SENSOR TUBE

BACKGROUND OF THE INVENTION

The present invention relates to a flow rate sensor capable of conducting measurement of a fluid flow rate with high sensitivity, without the need to heat the fluid to a high temperature.

In a process for manufacturing semiconductors, a flow rate sensor is used as a flow rate controller for stably supplying a liquid material, such as TEOS (tetraethyl orthosilicate), a copper (I) compound, DMAH (dymethyl aluminum hydride) or the like. For use as such a flow rate sensor, in many cases, a thermal type flow rate sensor has been conventionally used. A thermal type flow rate sensor applies heat to a fluid flowing through a sensor tube and detects a quantity of heat carried away by the flowing fluid.

In a conventional thermal type flow rate sensor, a heating temperature for the sensor tube is higher than room temperature by several tens of degrees Celsius. However, some types of liquid materials for semiconductors are extremely unstable relative to heat and form reaction products as a result of heat applied to the sensor tube. Therefore, the sensor tube must be periodically cleaned. Further, as a result of heat applied to the sensor tube, a convection current is generated in air outside the sensor tube, so that a tilt error due to the direction of mounting of the sensor occurs.

Further, when a liquid flows in the sensor tube, air bubbles are likely to be formed in the liquid as a result of heat applied to the sensor tube. The formation of air bubbles can result in large measurement errors.

As a device for heating the sensor tube of the above-mentioned thermal type flow rate sensor, a heating resistor in the form of a wire is wound in a coil around an outer wall surface of the sensor tube so as to provide a resistance of about 100 to 300Ω, and a current is supplied to the heating resistor for heating. The length of the coil is about several mm, and the sensor tube has an inner diameter of about 0.3 mm and an outer diameter of about 0.4 mm. About 100 mW of power is supplied to the heating resistor, so as to heat the heating resistor to about 80° C. A fluid is flowed in the sensor tube in this state, and variation of a resistance of the heating resistor is detected during flow of the fluid (reference is made to, for example, U.S. Pat. No. 3,938,384).

Generally, in thermal type flow rate sensors, an output flow rate from the sensor coincides with an actual flow rate, as long as laminar flow of the fluid can be maintained in the sensor tube. When a velocity of the fluid becomes high, turbulent flow is generated. In this case, the output flow rate becomes lower than the actual flow rate. To enable accurate measurement of a high flow rate of the fluid, a sensor tube having a large diameter and a sufficiently large length should be used. However, such a sensor tube is too large and is unsuitable for practical use. Therefore, conventionally a fluid flow has been divided between a sensor portion in which the flow rate of the fluid is detected in a range of 1 cc/min. or less and a bypass portion for increasing the flow rate. In this technique, no detection of the flow rate is conducted at the bypass portion, so that the bypass can be designed without restraint. Therefore, various arrangements of a small flow rate sensor of this type have been developed.

However, in a flow rate sensor of this type, the inner diameter of the sensor tube is small, so that the flow rate which can be measured by the sensor is limited. In order to measure a flow rate exceeding a certain level, it is necessary to provide a bypass portion in which a fluid flows at a flow rate proportional to that in the sensor portion. This necessitates use of a complicated sensor, and errors arising from the use of a divided flow can result. Further, when the bypass portion is clogged, a large measurement error is likely to occur.

SUMMARY OF THE INVENTION

In view of the above, the present invention has been made. It is an object of the present invention to provide a flow rate sensor which is free from the above-mentioned problems accompanied by conventional thermal type flow rate sensors and which is capable of conducting measurement of a fluid flow rate at a low heating temperature for the sensor tube.

According to the present invention, there is provided a flow rate sensor comprising: a pair of heating resistors operable to heat a sensor tube; a temperature sensor operable to control respective temperatures of the heating resistors; and a case operable to hold the heating resistors and the temperature sensor.

The flow rate sensor is adapted to detect a flow rate of a fluid flowing in the sensor tube, based on variations of voltages applied to the heating resistors, wherein the variations occur according to the flow rate of the fluid. The sensor further comprises a voltage applying device operable to arbitrarily set an increase in temperature of each of the heating resistors. The sensor tube has opposite ends thereof thermally connected to the case. The temperature sensor is positioned to be equidistant from the opposite ends of the sensor tube.

In the present invention, an increase in temperature of the heating resistors may be 5° C. or less from a temperature of the temperature sensor.

Further, the sensor tube may have a U-shaped configuration.

The sensor tube may be at least partially covered with a material having high heat conductivity.

Further, a plurality of narrow inner tubes may be provided within the sensor tube.

Further, a sensor tube guide made of a material having high heat conductivity and adapted to cover the sensor tube may be provided on the sensor tube, the sensor tube guide having the heating resistors provided thereon.

Further, the sensor tube guide may enclose the sensor tube and may be removably provided in the case.

Further, the heating resistors may comprise metallic thin films.

The foregoing and other objects, features and advantages of the present invention will be apparent from the following detailed description and appended claims taken in connection with the accompanying drawings.

DETAILED DESCRIPTION OF THE INVENTION

Hereinbelow, a flow rate sensor of the present invention is described, referring to FIGS. 1 to 12. In FIGS. 1 through 12, the same parts or portions are designated by the same reference numerals and characters, and overlapping explanations thereof are omitted. First, the principle of the flow rate sensor of the present invention is explained. Generally, in thermal type flow rate sensors, when the power applied to the heating resistor is increased to thereby increase the heating temperature, the sensitivity of the sensor becomes high. Therefore, as a method for improving the sensitivity of the thermal type flow rate sensor, a method of increasing the voltage applied to the heating resistor is generally employed.

However, the above-mentioned method cannot be applied to a fluid susceptible to heat. Therefore, the inventor of the present invention has investigated an output sensitivity of the thermal type flow rate sensor when the power applied to the heating resistor is maintained at a predetermined level. As a result, a characteristic curve b such as indicated in a graph shown in FIG. 1 has been obtained. That is, it has been found that when a resistance R of the heating resistor increases, a detection sensitivity (relative sensitivity) of the sensor increases in proportion to the square of the resistance R of the heating resistor.

Figure 1:
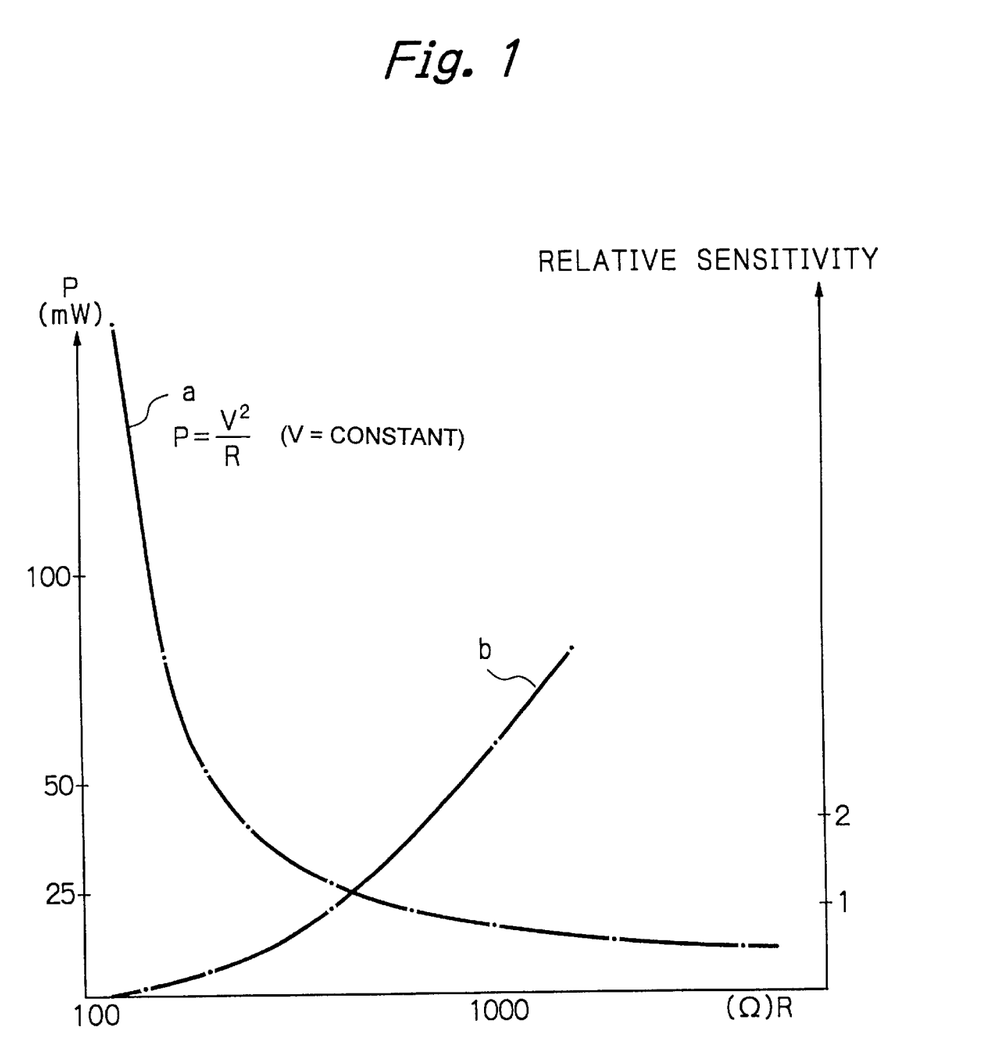
FIG. 1 shows a relationship between the resistance of and the power supplied to a heating resistor for explaining the principle of a flow rate sensor of the present invention.

On the other hand, when the resistance R of the heating resistor is increased while maintaining a voltage V applied to the heating resistor at a predetermined level, a power P supplied to the heating resistor decreases as indicated by curve a shown in the graph of FIG. 1. In view of this fact and the above-mentioned finding that the detection sensitivity becomes high as the resistance of the heating resistor becomes high, the inventor of the present invention has found that when a measurement range of flow rate is appropriately selected, it is possible to obtain a flow rate sensor having a desired sensitivity. Specifically, the inventor of the present invention has found from results of experiments that sufficient sensitivity can be obtained by using the heating resistor having a resistance of about 600Ω, even when the power applied to the heating resistor is as low as about 25 mW.

When the power applied to the heating resistor becomes low, the heating temperature also becomes low, thereby enabling use of the sensor for the heat-susceptible fluid. On the other hand, when the heating temperature is low, the sensor is likely to be affected by room temperature and the like. This can be avoided, however, by controlling the temperature of the heating resistor by enabling respective temperatures of opposite ends of the sensor tube to be the same and controlling a value corresponding to each of the respective temperatures.

Figure 2:
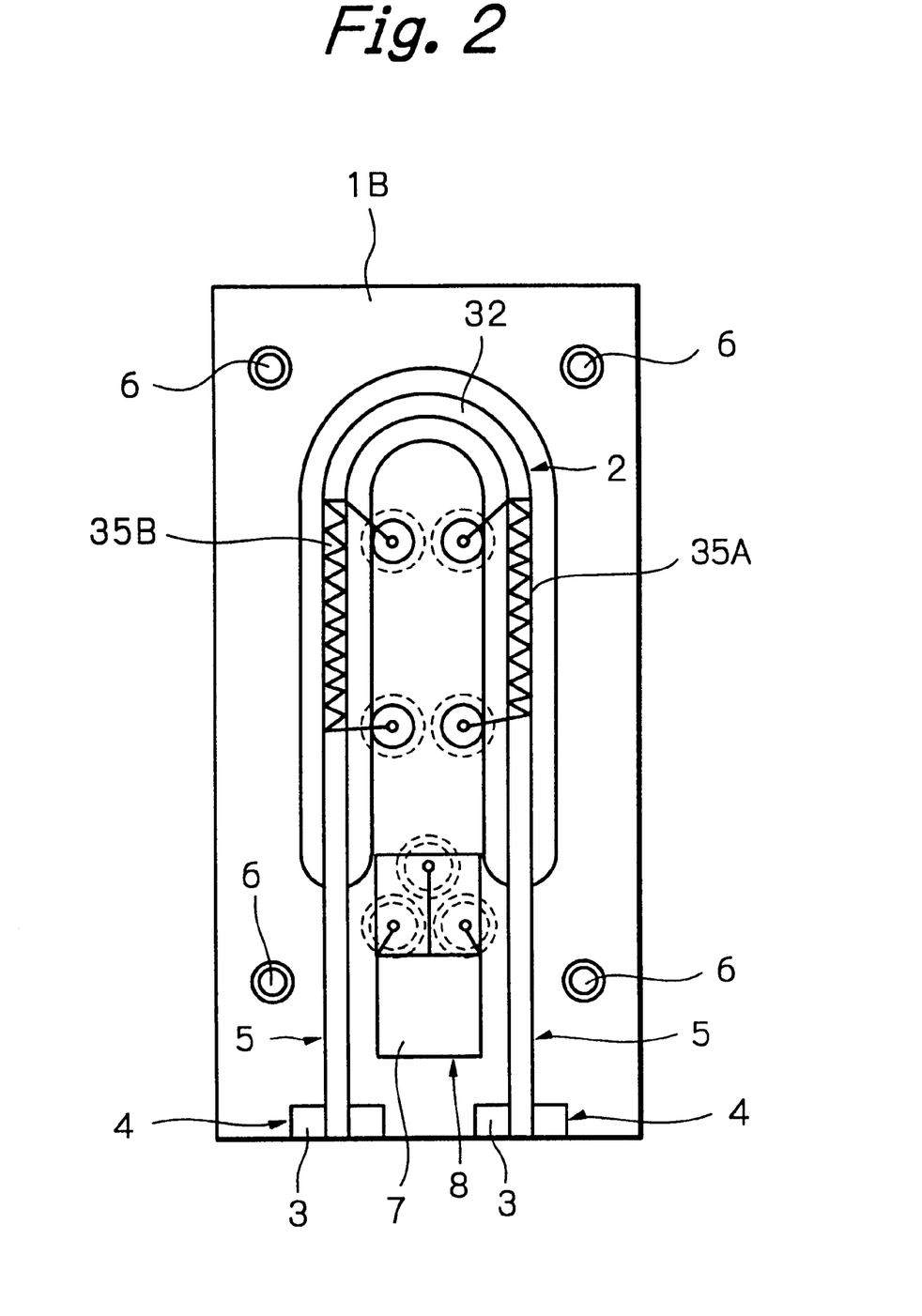
FIG. 2 is a plan view of the flow rate sensor according to a first embodiment of the present invention in which an upper case is removed.
Figure 3:
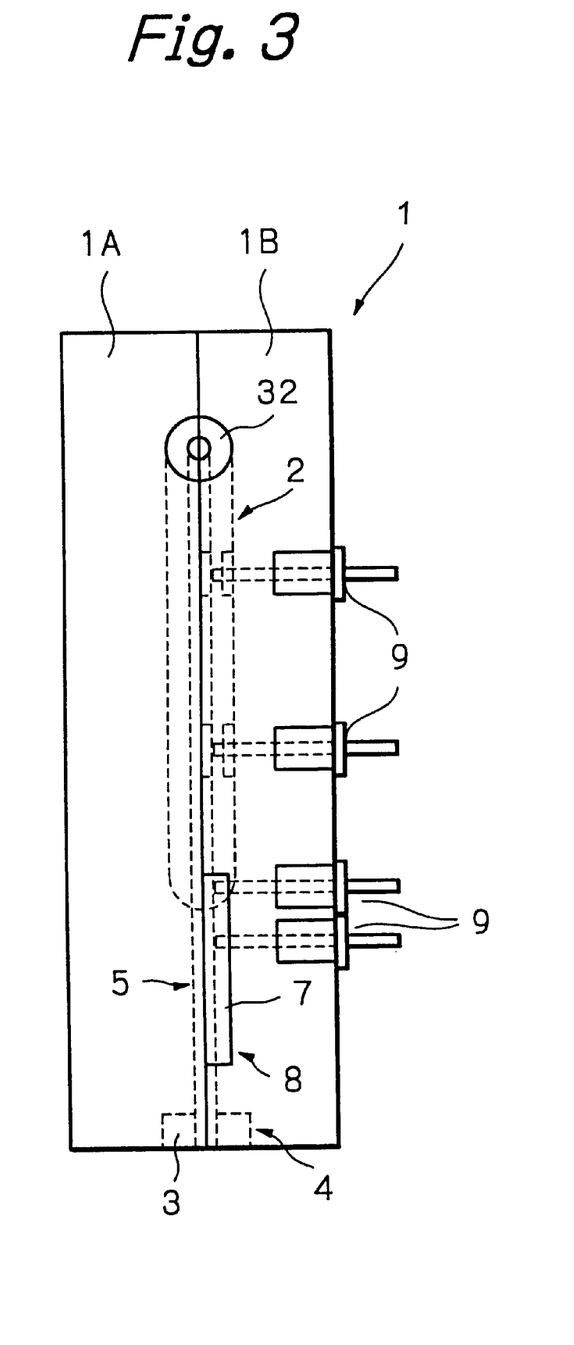
FIG. 3 is a cross-sectional view of the flow rate sensor according to the first embodiment of the present invention.

FIGS. 2 and 3 show an arrangement of a flow rate sensor according to a first embodiment of the present invention. A rectangular upper case 1A and a rectangular lower case 1B are fixedly connected to each other via screws, to thereby obtain a case 1. Each of the upper case 1A and the lower case 1B includes: a U-shaped groove 2 which provides a space for containing a central portion of a U-shaped sensor tube 32; bore portions 4 for containing circular flanges 3 to be fitted onto opposite end portions of the sensor tube 32; and connecting grooves 5 for connecting the groove 2 and the bore portions 4. The sensor tube 32 is made of stainless steel (JIS SUS 316) and has an outer diameter of 1.6 mm and an inner diameter of 0.8 mm.

The connecting grooves 5 are formed so as to provide a diameter such that the sensor tube 32 and the case 1 make contact with each other. Therefore, the opposite end portions of the sensor tube 32 are thermally connected to the case 1 through the flanges 3 and are also thermally connected to the case 1 at the connecting grooves 5. Threaded bores 6 are formed in each of the upper case 1A and the lower case 1B for accommodating the screws for fixedly connecting the upper case 1A and the lower case 1B.

The sensor tube 32 comprises a U-shaped bent portion and straight portions extending to the U-shaped bent portion. A pair of heating resistors 35A and 35B are provided at the straight portions of the sensor tube 32. As each of the heating resistors 35A and 35B, a wire having an outer diameter of 30 microns and a resistance of about 0.5Ω/mm (length) is used. The length of the wire is determined so that each of the heating resistors 35A and 35B has a resistance of about 1,000Ω. In the lower case 1B, a space 8 for containing a temperature sensor 7 is formed at a central position between the right-hand and left-hand connecting grooves 5. The temperature sensor 7 is used for controlling respective temperatures of the heating resistors 35A and 35B.

Seven terminals 9 are provided so as to protrude from the lower case 1B on a back side thereof opposite to a side on which the groove 2 is formed. Four terminals 9 are connected to opposite ends of the heating resistor 35A and opposite ends of the heating resistor 35B. The remaining three terminals 9 are connected to three leads of the temperature sensor 7.

Figure 4:
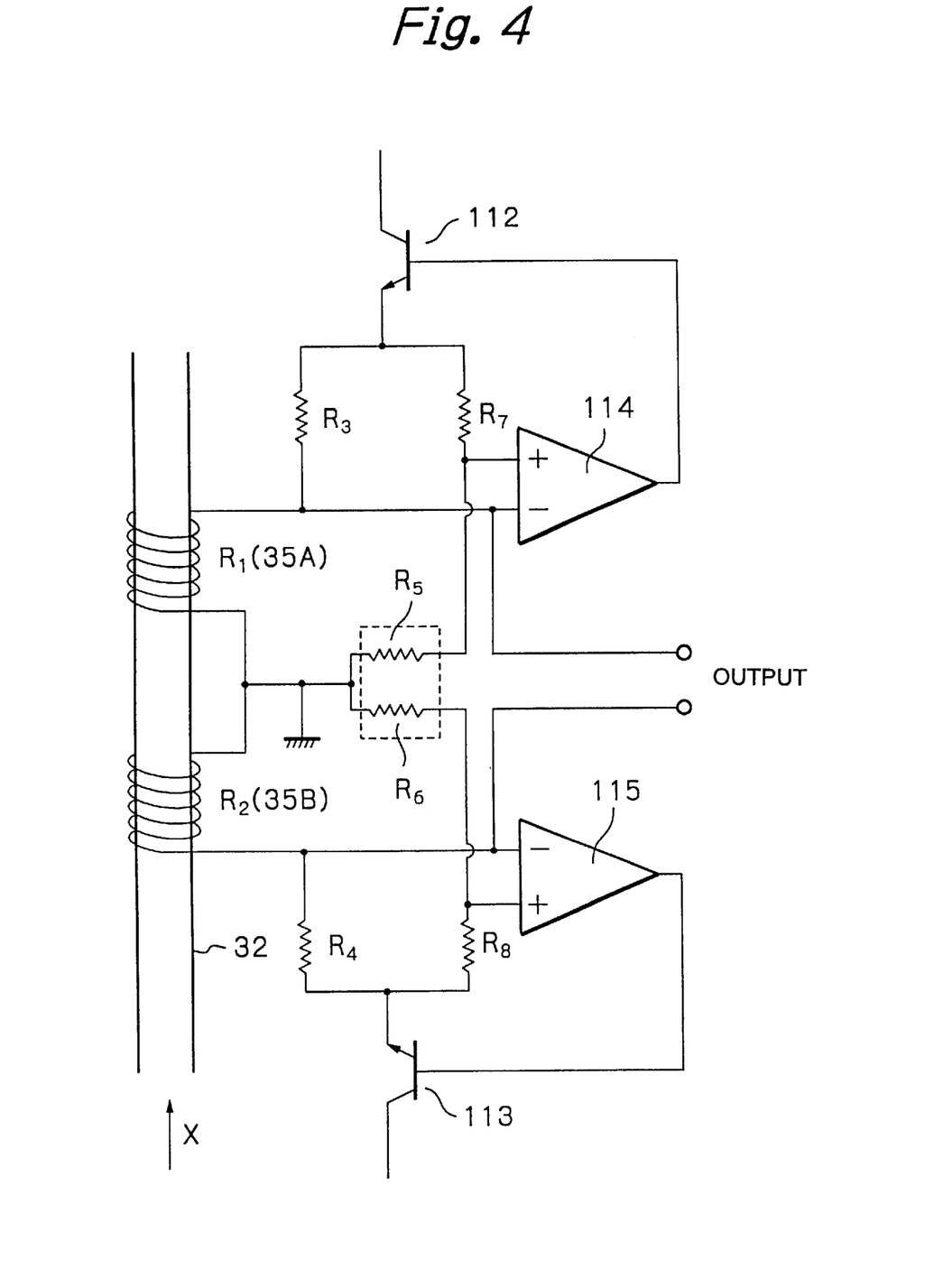
FIG. 4 is a circuit diagram of the flow rate sensor of the present invention.

An example of a circuit diagram of the flow rate sensor of the present invention is shown in FIG. 4. In this example, a heating resistor $R_1$ (corresponding to the heating resistor 35A) and a heating resistor $R_2$ (corresponding to the heating resistor 35B) are provided on the sensor tube 32 and a fluid is caused to flow in a direction indicated by an arrow X. A voltage and a current are supplied from a power source (not shown) through a transistor 112 to a bridge circuit including the heating resistor $R_1$. The voltage and current from the power source are also supplied through a transistor 113 to a bridge circuit including the heating resistor $R_2$. The current from the transistor 112 flows into a heating resistor $R_3$ and a heating resistor $R_7$. In this circuit, the heating resistor $R_7$ is connected to the earth through a temperature measurement matching resistor $R_5$ having a temperature coefficient equal to that of the temperature sensor 7.

The current from the transistor 113 flows into a heating resistor $R_4$ and a heating resistor $R_8$. In this circuit, the heating resistor $R_8$ is connected to the earth through a temperature measurement matching resistor $R_6$ having a temperature coefficient equal to that of the temperature sensor 7. The voltages drawn from the connection between the heating resistor $R_3$ and the heating resistor $R_1$ and the connection between the heating resistor $R_7$ and the temperature measurement matching resistor $R_5$ (having the temperature coefficient equal to that of the temperature sensor 7) are supplied to a comparator 114, where the amount of difference between these voltages is obtained. A base current for the transistor 112 is controlled so that the bridge circuit including the heating resistor $R_1$ balances. Further, the voltages drawn from the connection between the heating resistor $R_4$ and the heating resistor $R_2$ and the connection between the heating resistor $R_8$ and the temperature measurement matching resistor $R_6$ (having the temperature coefficient equal to that of the temperature sensor 7) are supplied to a comparator 115, where the amount of difference between these voltages is obtained. A base current for the transistor 113 is controlled so that the bridge circuit including the heating resistor $R_2$ balances. As the temperature measurement matching resistor having the temperature coefficient equal to that of the temperature sensor 7, the resistor described in Japanese Utility Model Registration No. 2567550 can be used.

In the above-mentioned arrangement, respective temperatures of the heating resistors $R_1$ and $R_2$ are controlled so that they are higher than those of the temperature measurement matching resistors $R_5$ and $R_6$ by 3° C. Illustratively stated, the value of resistance of each of the heating resistors $R_7$ and $R_8$ is set to 1,076Ω and, as each of the temperature measurement matching resistors $R_5$ and $R_6$, a platinum thin-film resistor having a resistance of 1 kΩ at 0° C. is used. The temperature measurement matching resistors $R_5$ and $R_6$ have a temperature coefficient of about 3,800 ppm. Therefore, each of the temperature measurement matching resistors $R_5$ and $R_6$ has a resistance of 1,076Ω at room temperature (20° C.).

As each of the heating resistors $R_1$ and $R_2$, use is made of a resistor having a temperature coefficient of about 3,800 ppm which is the same as the temperature coefficient of the temperature measurement matching resistors $R_5$ and $R_6$. As mentioned above, the temperatures of the heating resistors $R_1$ and $R_2$ are 3° C. higher than those of the temperature measurement matching resistors $R_5$ and $R_6$, that is, 23° C. Therefore, as each of the heating resistors $R_3$ and $R_4$, a resistor having a resistance of 1,087Ω is used. In this arrangement, a current is supplied to the bridge circuits until respective temperatures of the heating resistors $R_1$ and $R_2$ become 23° C. and the value of a resistance of each of the heating resistors $R_1$ and $R_2$ becomes 1,087Ω, to thereby conduct heating. In this instance, the current is also supplied to each of the temperature measurement matching resistors $R_5$ and $R_6$. However, an increase in temperature of the temperature measurement matching resistors $R_5$ and $R_6$ can be ignored, because the lower case 1B is made of aluminum having a sufficiently large heat capacity as compared to the sensor tube 32 and the temperature measurement matching resistors $R_5$ and $R_6$ are adhered to the lower case 1B by means of an adhesive material. Heating of the temperature measurement matching resistors $R_5$ and $R_6$ can be easily prevented by setting the value of resistance of each of the temperature measurement matching resistors $R_5$ and $R_6$ and the heating resistors $R_7$ and $R_8$ to a high level. In the flow rate sensor in this embodiment, when ETOH (ethyl alcohol) was used as the flow fluid in the sensor tube 32, satisfactory output linearity could be obtained in a measurement range of flow rate of from 0 cc/min. to 0.1 cc/min. Further, because the temperature of the sensor tube 32 was maintained at a low level, stable measurement could be conducted without occurrence of a problem such as formation of air bubbles in the ETOH, which is encountered in conventional techniques. In the present invention, the problem of formation of air bubbles can be avoided in most fluids by limiting an increase in temperature of the heating resistors for heating the sensor tube 32 to 5° C. or less. According to the present invention, it has become possible to conduct appropriate measurement of a flow rate even when an increase in temperature of the heating resistors is extremely small, i.e., 5° C. or less. Thus, in the first embodiment of the present invention (as well as other embodiments of the present invention), use is made of a voltage applying device operable to apply voltages to the heating resistors so that an increase in temperature of the sensor tube due to the effect of the heating resistors is several degrees Celsius.

Figure 5:
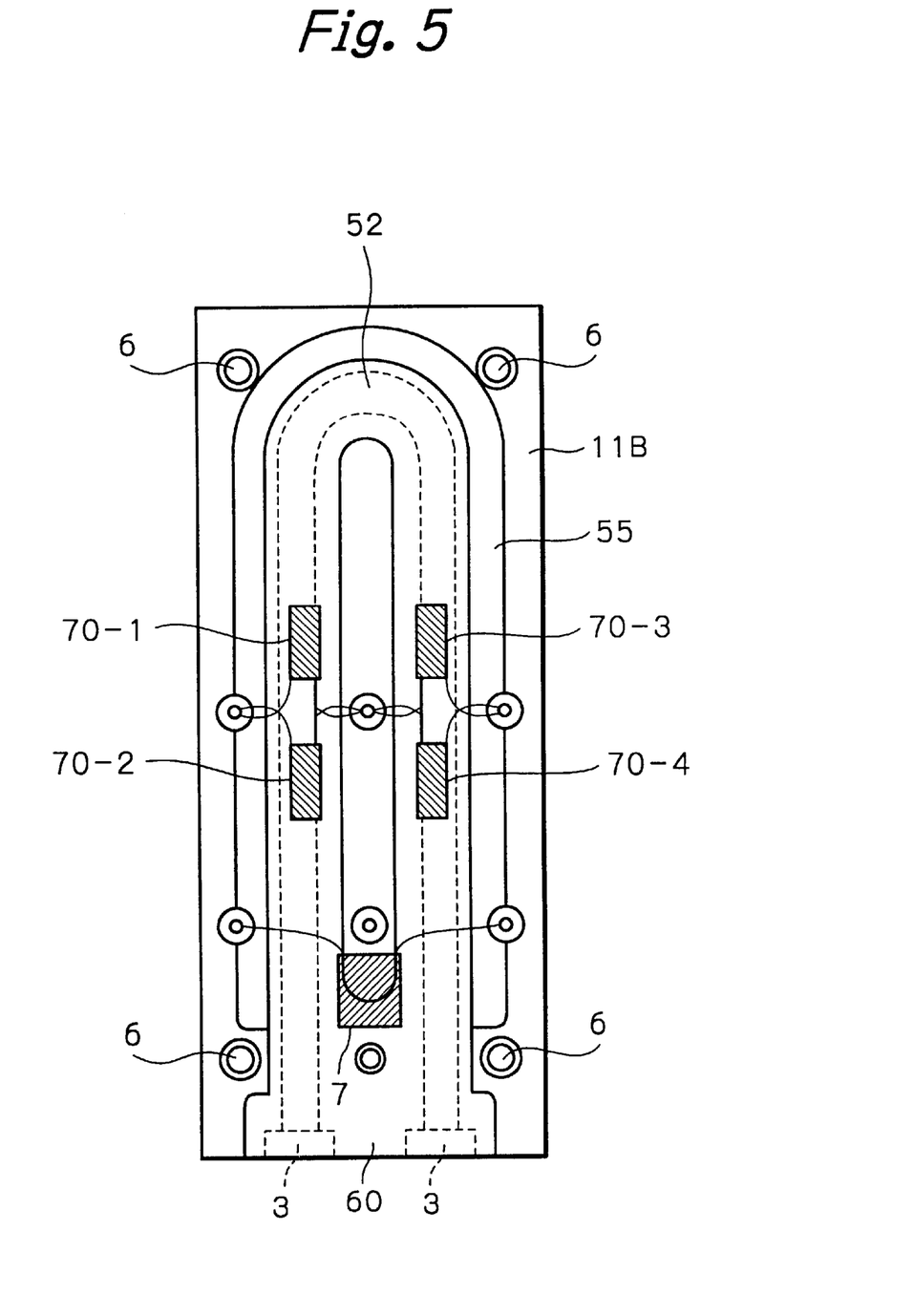
FIG. 5 is a plan view of the flow rate sensor according to a second embodiment of the present invention in which an upper case is removed.
Figure 6:
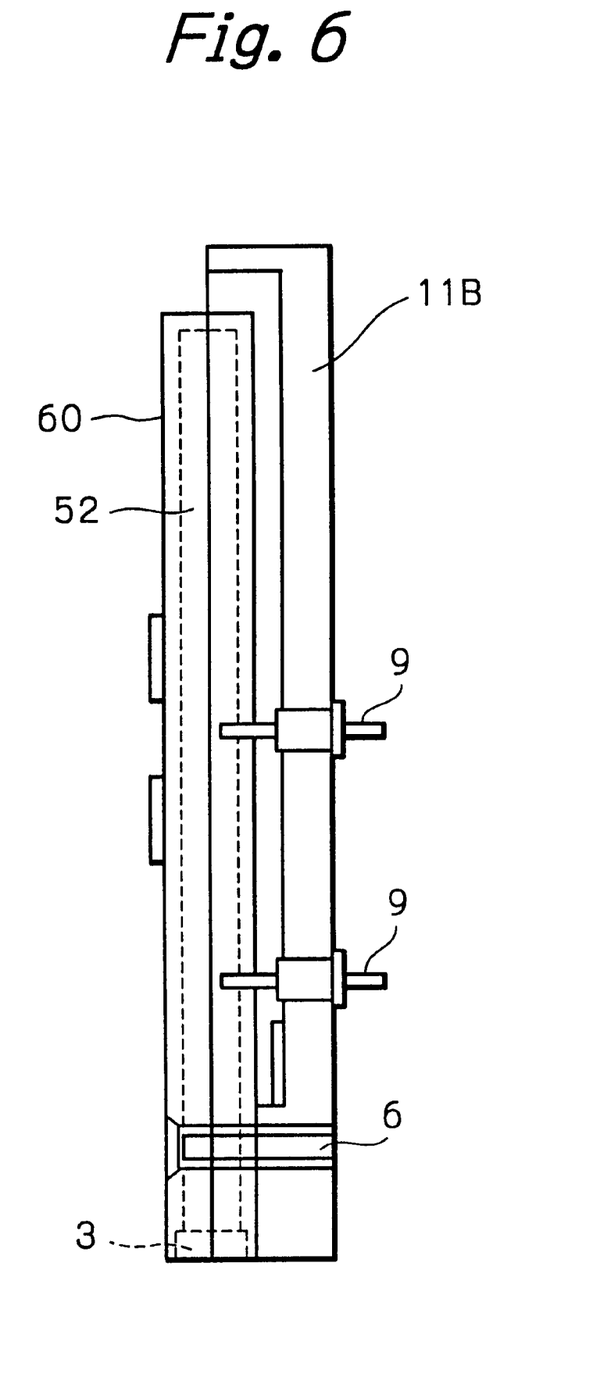
FIG. 6 is a cross-sectional view of the flow rate sensor according to the second embodiment of the present invention.
Figure 7:
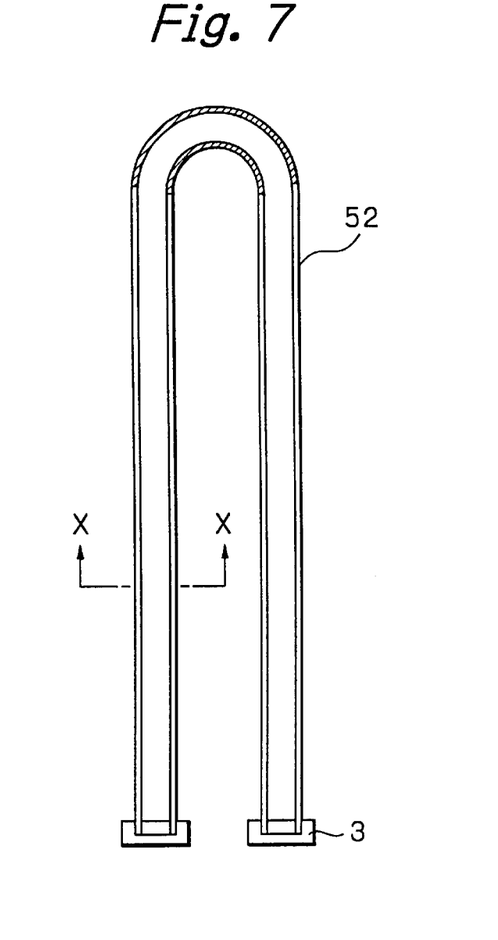
FIG. 7 is a longitudinal cross-sectional view of a sensor tube used for the flow rate sensor according to the second embodiment of the present invention.
Figure 8:
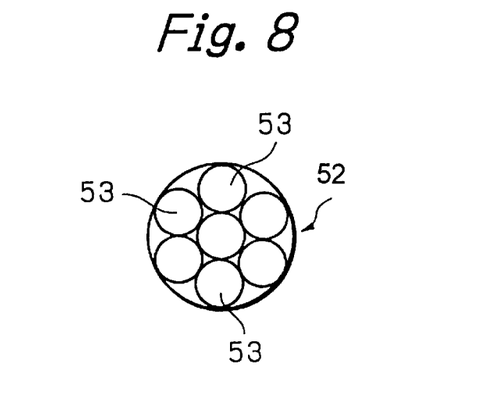
FIG. 8 is a cross-sectional view of the sensor tube of FIG. 7 according to the second embodiment of the present invention taken along the line X—X.

FIGS. 5 and 6 show an arrangement of a flow rate sensor according to a second embodiment of the present invention. A rectangular upper case and a lower case 11B in substantially the same form as the upper case are fixedly connected to each other by means of screws, to thereby obtain a case. In the upper case and the lower case 11B, a tube guide 60 is contained. The tube guide 60 is adapted to contain a U-shaped sensor tube 52 shown in FIG. 7 as a single unit. The sensor tube 52 is made of stainless steel (JIS SUS 316) and has an outer diameter of 4 mm and an inner diameter of 3 mm. In this embodiment, as shown in FIG. 8, a plurality of inner tubes 53 made of stainless steel (JIS SUS 316), each having an outer diameter of 1.0 mm and an inner diameter of 0.8 mm, are provided within the sensor tube 52, such that respective outer wall surfaces of the inner tubes 53 are in contact with each other. This comes from an idea such that it is possible to achieve the same effect as that of a single large-diameter and long sensor tube by employing a bundle of narrow sensor tubes each having an inner diameter of about 1 mm. The circular flanges 3 shown in FIG. 7 are fitted onto opposite end portions of the sensor tube 52.

Figure 9:
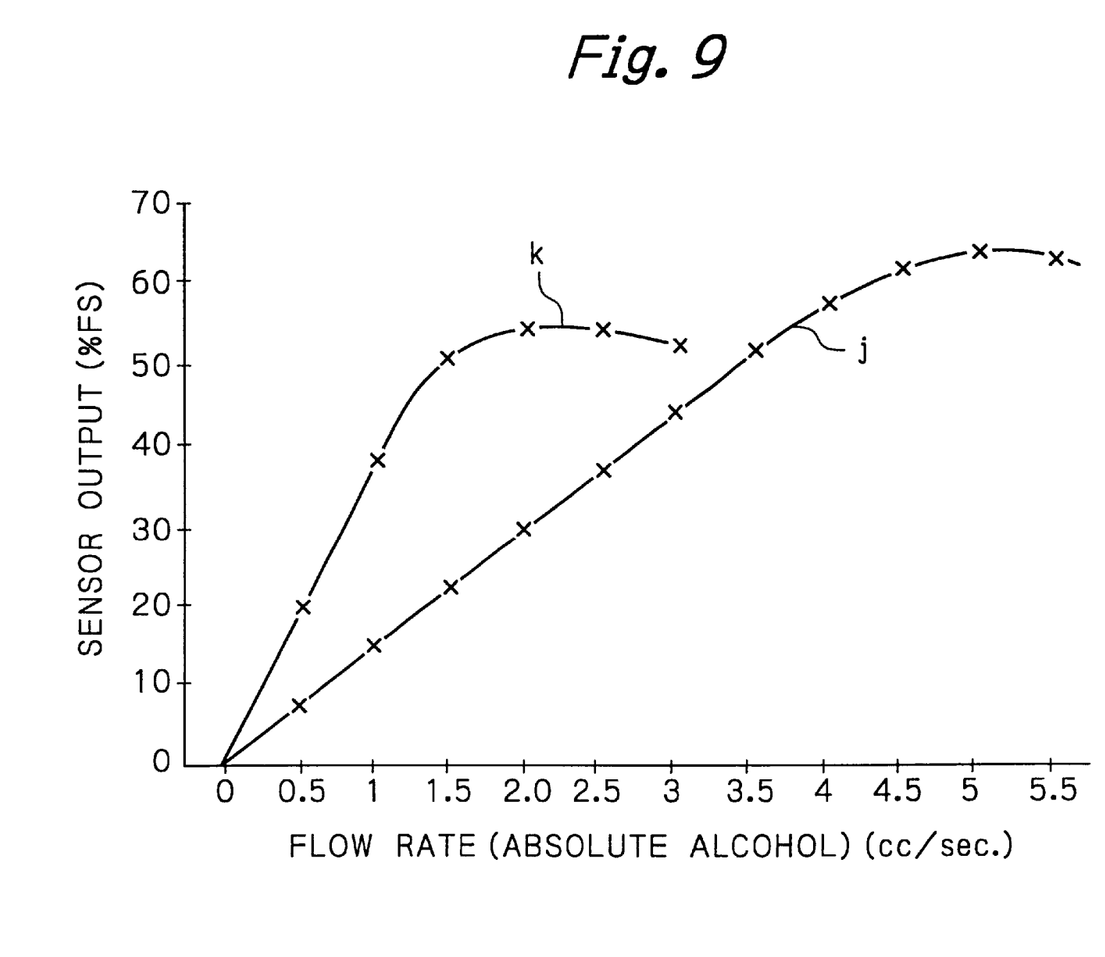
FIG. 9 is a graph showing output characteristics of the flow rate sensor according to the second embodiment of the present invention.

In the flow rate sensor arranged as mentioned above, in which the plurality of inner tubes 53 are provided within the sensor tube 52, a laminar flow of fluid was obtained and as a result of this, an improvement of output characteristics was observed. FIG. 9 shows the improvement of output characteristics of the flow rate sensor in this embodiment. In FIG. 9, a curve j indicates output characteristics of the sensor utilizing the sensor tube 52 which has the inner tubes 53 provided therein. A curve k indicates output characteristics of the sensor utilizing the sensor tube having no inner tubes 53. From FIG. 9, it is understood that with respect to the sensor utilizing the sensor tube 52 (having the inner tubes 53 provided therein), a flow rate range in which a linear output is obtained is about three times wider than that of the sensor utilizing the sensor tube having no inner tubes 53.

Figure 10A:
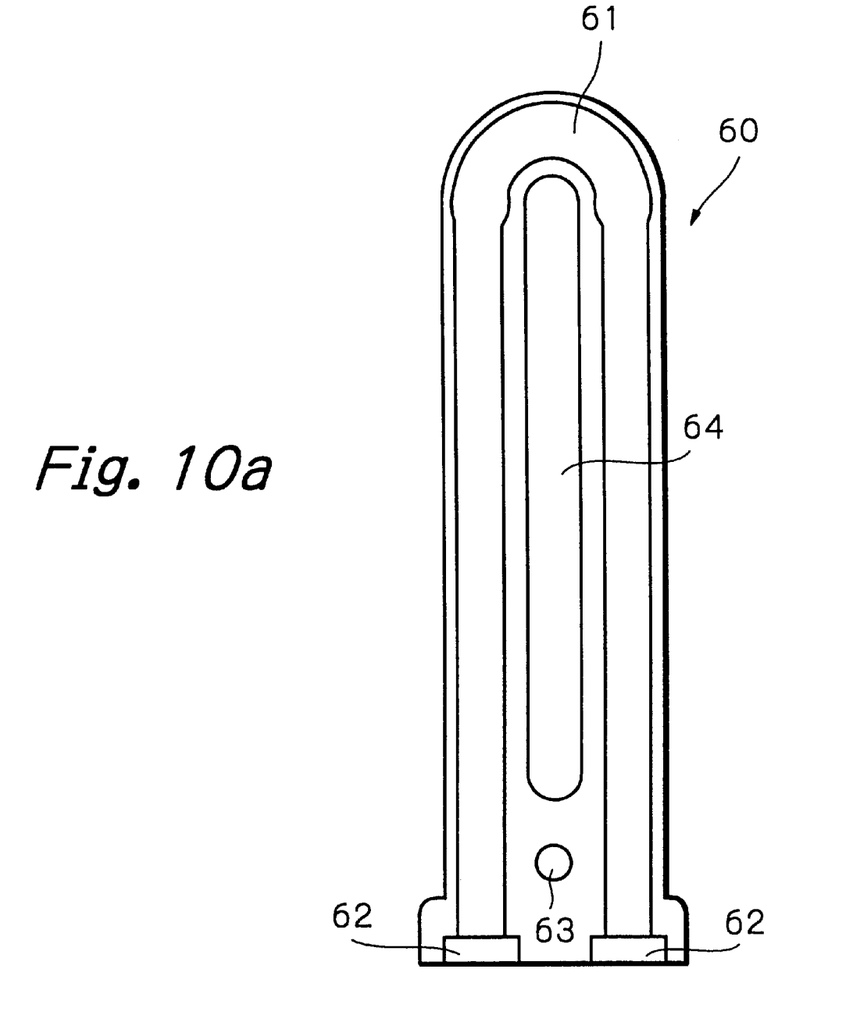
FIG. 10a is a plan view of a lower case of a sensor tube guide used for the flow rate sensor according to the second embodiment of the present invention.
Figure 10B:
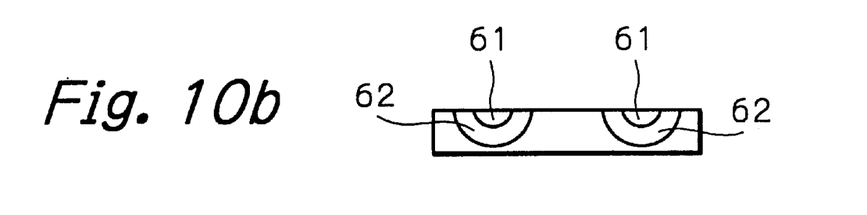
FIG. 10b is a bottom view of the lower case of the sensor tube guide used for the flow rate sensor according to the second embodiment of the present invention.

The arrangement of the tube guide 60 for covering the sensor tube 52 is shown in FIGS. 10a and 10b. The tube guide 60 comprises an upper case and a lower case. FIGS. 10a and 10b show only the lower case of the tube guide 60, but the upper and lower cases of the tube guide 60 are basically in the same form. Each of the lower case and the upper case of the tube guide 60 is made of aluminum, and has a long platy form with one end portion having a semi-circular form and the other end portion having a pedestal-like form.

Each of the upper and lower cases of the tube guide 60 includes: a U-shaped groove 61 for containing the U-shaped sensor tube 52, such that the U-shaped sensor tube 52 is in contact with the tube guide 60; recesses 62 for containing the circular flanges 3 to be fitted onto the opposite end portions of the sensor tube 52; and a threaded bore 63. The threaded bore 63 is used for connecting the upper case and the lower case via screws, after the upper and lower cases are fixed to each other by using an adhesive material so as to cover the sensor tube 52. Each of the upper and lower cases includes a slot 64 conforming to the shape of the sensor tube 52.

The tube guide 60 is provided from the viewpoint of rapid transition to heat balance in the sensor tube 52. That is, although the sensor tube 52 is made of stainless steel (JIS SIJS 316) to provide high corrosion resistance, corrosion-resistant alloys such as stainless steel have poor heat conductivity. In addition, the sensor tube 52 has poor output response time due to its relatively large diameter. Therefore, as mentioned above, the sensor tube 52 is entirely covered with the tube guide 60 made of a material having high heat conductivity, such as aluminum. By this arrangement, the occurrence of heat balance in the sensor tube 52 can be accelerated, leading to a quick output response time.

Figure 11A:
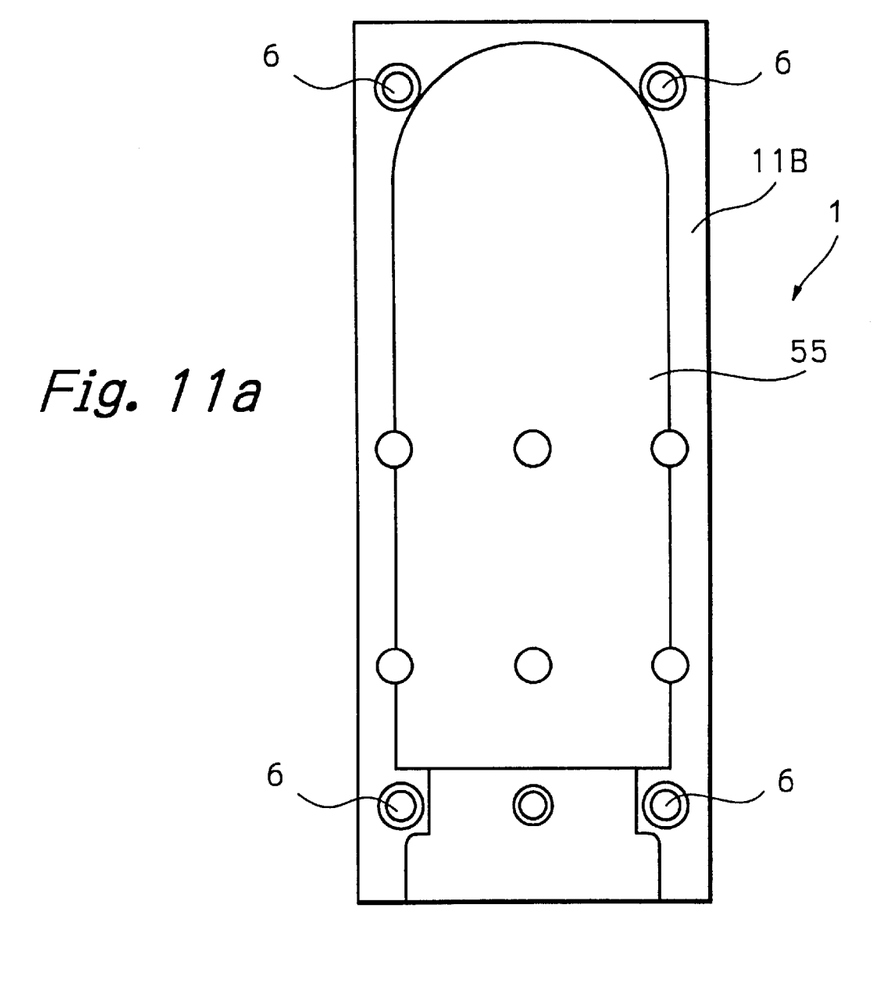
FIG. 11a is a plan view of a lower case of the flow rate sensor according to the second embodiment of the present invention.
Figure 11B:
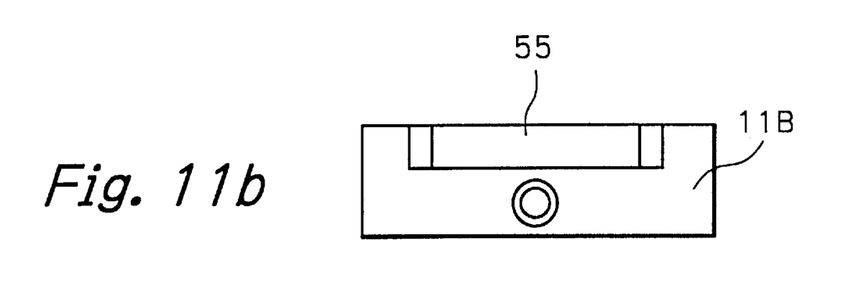
FIG. 11b is a bottom view of the lower case of the flow rate sensor according to the second embodiment of the present invention.

The tube guide 60 is contained in the upper case and the lower case 11B [shown in FIGS. 11a and 11b] of the rectangular case. The case is obtained by fixedly connecting the upper case and the lower case 11B via screws. Each of the upper case and the lower case 11B includes a recess 55 confirming to the contour of the tube guide 60, for accommodating the tube guide 60.

In this embodiment, four heating resistors 70-1 to 70-4 (FIG. 5) are attached to the tube guide 60. Each of the heating resistors 70-1 to 70-4 comprises a platinum chip resistor including a ceramic substrate and a platinum resistor deposited on the substrate by vapor deposition. The value of a resistance of each of the heating resistors 70-1 to 70-4 is 1 kΩ. The heating resistors 70-1 and 70-2 are connected in parallel so as to correspond to the heating resistor 35A in FIG. 4, and the heating resistors 70-3 and 70-4 are connected in parallel so as to correspond to the heating resistor 35B in FIG. 4.

Thus, two resistors each having a resistance of 1 kΩ are connected in parallel and are used as a heating resistor having a resistance of 500Ω. By this arrangement, sufficient sensitivity of the sensor can be obtained by supplying less current, that is, by generating less heat, as compared to the conventional wound type heating resistor having a resistance of about 100Ω to 300Ω.

As the temperature sensor 7 for measuring a reference temperature for heating the sensor tube 52, a platinum chip resistor having a resistance of 1 kΩ is adhered to the case 1. Further, the heating resistors 70-1 to 70-4 each comprising the platinum chip resistor on the tube guide 60 are heated so that respective temperatures thereof become higher than the above-mentioned reference temperature by about 2° C.

When the fluid flows in the sensor tube 52, due to the occurrence of transmission of heat through the fluid, the voltages applied to maintain the temperature of the heating resistors 70-1 to 70-4 on the tube guide 60 at a predetermined level vary. By detecting the variations of the applied voltages, a mass flow rate of the fluid can be detected. In the embodiment shown in FIG. 5, satisfactory output linearity could be obtained in the flow rate range of 0 to 6 cc/min. The tube guide 60 is out of a cartridge type. Therefore, to conduct measurement over different flow rate ranges, the same sensor can be used simply by replacing the tube guide 60 with another tube guide suitable for a desired flow rate range. Thus, the sensor can be applied to measurement over a wide range of flow rate ranges.

Thus, in the second embodiment, measurement can be conducted over a wide range of flow rate via a small flow rate sensor without the need to use the bypass portion. Further, because a material having high heat conductivity is used for the tube guide 60, a response time for output can be reduced, leading to a quick response. Because the tube guide 60 is used, it is possible to replace a conventional cumbersome operation for winding the heating resistor around the sensor tube by adhering the chip resistor on the tube guide. This markedly improves manufacturing efficiency with respect to the sensor. With regard to the chip resistors used as the heating resistors on the tube guide 60, a chip resistor which produces only extremely minor measurement errors at an arbitrary value of resistance can be easily obtained. Therefore, the sensor including detection circuits can be designed with a high degree of freedom. Further, the heating temperature for the sensor tube 52 is controlled so that it is merely 2° C. higher than the reference temperature of the case 1, so that the sensor tube can be applied to the fluid susceptible to heat. Needless to say, providing narrow tubes in the sensor tube and using the metallic thin-film chip resistors as the heating resistor in this embodiment can be applied to other embodiments of the present invention.

Figure 12:
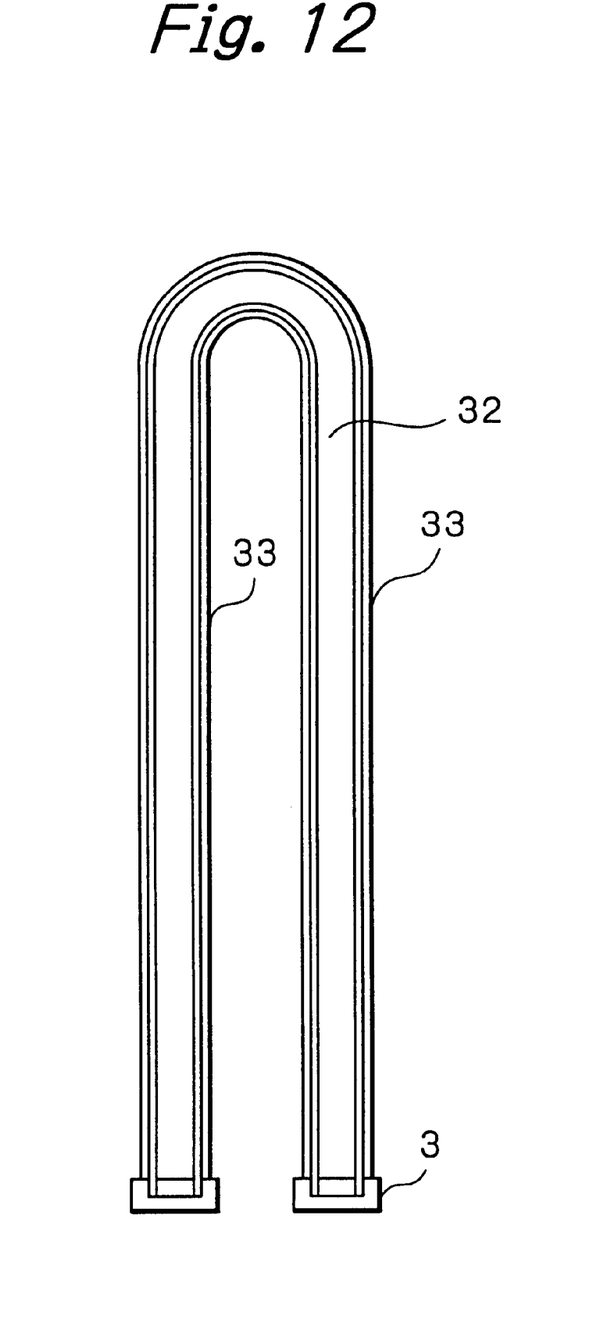
FIG. 12 is a longitudinal cross-sectional view of a sensor tube used for a flow rate sensor according to a third embodiment of the present invention.

Next, referring to FIG. 12, a flow rate sensor according to a third embodiment of the present invention is explained. In this embodiment, silver plating 33 is formed on a surface of the sensor tube 32 so as to improve heat transmission on the sensor tube 32. The sensor tube 32 having the silver plating 33 formed thereon is applied to the flow rate sensor in the first embodiment shown in FIGS. 2 and 3. Therefore, a wound type resistor is applied to the sensor tube 32. The value of resistance of this wound type resistor is 1 kΩ which is higher than that of the conventional wound type resistor. An amount of change in the value of resistance of the resistor due to a temperature change is increased so as to operate the sensor at a low heating temperature.

Because the silver plating having high heat conductivity is formed on the surface of the sensor tube 32, the occurrence of heat balance on the sensor tube 32 is accelerated, leading to a quick response time. In the third embodiment, the sensor tube 32 is a narrow tube having an inner diameter of 0.8 mm. Therefore, it is unnecessary to provide narrower tubes in the sensor tube 32.

As has been described above, the flow rate sensor of the present invention comprises a pair of heating resistors operable to heat a sensor tube, a temperature sensor operable to control respective temperatures of the heating resistors and a case operable to hold the heating resistors and the temperature sensor, wherein the sensor is adapted to detect a flow rate of a fluid flowing in the sensor tube based on variations of voltages applied to the heating resistors, wherein the variations occur according to the flow rate of the fluid, and voltage applying device operable to arbitrarily set an increase in temperature of each of the heating resistors. Therefore, according to the present invention, a flow rate sensor which has high sensitivity and which produces only extremely minor measurement errors under the influence of heat can be obtained by appropriately selecting the values of resistance of the heating resistors so that an increase in temperature of the sensor tube due to the effect of the heating resistors in several degrees Celsius.

What is claimed is:

1. A flow rate sensor for detecting a flow rate of a fluid, said flow rate sensor comprising:

a sensor tube operable to allow a fluid to flow therein;

a sensor tube guide adapted to cover said sensor tube and contact said sensor tube;

a plurality of narrow inner tubes provided within said sensor tube;

a pair of heating resistors operable to heat said sensor tube, said pair of heating resistors provided on said sensor tube guide;

a temperature sensor operable to control temperatures of said pair of heating resistors, said temperature sensor being positioned equidistant from opposite ends of said sensor tube;

a case adapted to hold said pair of heating resistors and said temperature sensor; and a voltage applying device operable to set an increase in temperature of each of said pair of heating resistors;

wherein said sensor tube has opposite ends thereof thermally connected to said case; and wherein said flow rate sensor is adapted to detect a flow rate of the fluid flowing in said sensor tube based on variations of voltages applied to said pair of heating resistors, the variations occurring according to the flow rate of the fluid.

2. A flow rate sensor as claimed in claim 1, wherein the increase in temperature of each of said pair of heating resistors is 5° C. or less than a temperature of said temperature sensor.

3. A flow rate sensor as claimed in claim 1, wherein said sensor tube has a U-shaped configuration.

4. A flow rate sensor as claimed in claim 3, wherein said tube guide comprises an upper case and a lower case, each of said upper and said lower cases having a U-shaped groove for containing the U-shaped sensor tube, and said upper and said lower cases being connected together via screws.

5. A flow rate sensor as claimed in claim 1, wherein said sensor tube guide is made of a material having a high heat conductivity.

6. A flow rate sensor as claimed in claim 1, wherein said sensor tube guide encloses the sensor tube and is removably provided in said case.

7. A flow rate sensor as claimed in claim 1, wherein said pair of heating resistors comprise metallic thin films.

8. A flow rate sensor as claimed in claim 1, wherein said case comprises an upper case and a lower case, wherein said upper case and said lower case are fixedly connected to each other via screws.

* * * * *